United States Patent
Hosseini et al.

(10) Patent No.: US 10,856,284 B2
(45) Date of Patent: Dec. 1, 2020

(54) RESOURCE ALLOCATION FOR A SHORT TRANSMISSION TIME INTERVAL (STTI) SYSTEM

(71) Applicant: QUALCOMM Incorporated, San Diego, CA (US)

(72) Inventors: Seyedkianoush Hosseini, San Diego, CA (US); Shashank Maiya, Milpitas, CA (US); Amir Farajidana, Sunnyvale, CA (US); Wenshu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/276,258

(22) Filed: Feb. 14, 2019

(65) Prior Publication Data

US 2019/0261328 A1 Aug. 22, 2019

Related U.S. Application Data

(60) Provisional application No. 62/710,308, filed on Feb. 16, 2018.

(51) Int. Cl.
*H04W 72/04* (2009.01)
*H04L 5/00* (2006.01)

(52) U.S. Cl.
CPC .......... *H04W 72/042* (2013.01); *H04L 5/005* (2013.01); *H04L 5/0044* (2013.01); *H04L 5/0051* (2013.01); *H04L 5/0092* (2013.01)

(58) Field of Classification Search
CPC ..... H04L 5/0044; H04L 5/005; H04L 5/0051; H04L 5/0092; H04W 72/04; H04W 72/042; H04W 72/1278; H04W 72/1289; H04W 72/14
See application file for complete search history.

(56) References Cited

U.S. PATENT DOCUMENTS

2011/0230219 A1  9/2011  Shores et al.
2013/0128852 A1* 5/2013  Xue ............... H04W 72/04
                                       370/329

(Continued)

FOREIGN PATENT DOCUMENTS

WO  2017136592 A1  8/2017

OTHER PUBLICATIONS

International Search Report and Written Opinion—PCT/US2019/018309—ISA/EPO—May 16, 2019.

(Continued)

*Primary Examiner* — Kan Yuen

(57) ABSTRACT

Various aspects of the present disclosure generally relate to wireless communication. In some aspects, a wireless communication device may identify that a last resource block of a resource allocation for a physical downlink shared channel (PDSCH) is in a last allocable resource block group (RBG); and determine whether one or more additional resource blocks, subsequent to the last resource block, are included in the resource allocation for the PDSCH based at least in part on at least one of a reference signal type associated with the PDSCH, a quantity of the one or more additional resource blocks, or the DCI format associated with the PDSCH. Numerous other aspects are provided.

29 Claims, 14 Drawing Sheets

(56) References Cited

U.S. PATENT DOCUMENTS

2016/0050000 A1* 2/2016 Zhang .................. H04B 7/0417
                                                        375/267
2017/0188347 A1* 6/2017 Chen ...................... H04L 5/0048
2017/0201967 A1* 7/2017 Yang ....................... H04L 5/143
2017/0310429 A1* 10/2017 Wang ................... H04L 1/1854

OTHER PUBLICATIONS

Qualcomm Incorporated: "DL Channel Design for Shortened TTI," 3GPP Draft; R1-164458, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 14, 2016 (May 14, 2016), pp. 1-7, XP051096436, Retrieved from the Internet: URL: http://www.3gpp.org/ftp/tsg_ran/WG1_RL1/TSGR1_85/Docs/ [retrieved on May 14, 2016] paragraph [02.1].

* cited by examiner

| | | Bandwidths | | |
|---|---|---|---|---|
| | | 5MHz | 10MHz | 15MHz |
| Parameters | Number of RBs | 25 | 50 | 75 |
| | Index Range | 0-24 | 0-49 | 0-74 |
| | RBG Size | 4 | 6 | 4 |
| | Starting Point Granularity | 2 | 6 | 4 |
| | DMRS PRG size | 2 | 2 | 2 |
| | Index value of last RB of last allocable RBG | 21, 23 | 47 | 71 |
| | # of additional RBs | 24-23 = 1 or 24-21 = 3 | 49-47=2 | 74-71=3 |
| Results | RS type = CRS include additional RB(s)? | Index 23, YES(1) Index 21, YES(3) | YES(2) | YES(3) |
| | RS type = DMRS Include additional RB(s)? | Index 23, NO Index 21, YES (2) | YES(2) | YES (2) |

FIG. 11

RESOURCE ALLOCATION FOR A SHORT TRANSMISSION TIME INTERVAL (STTI) SYSTEM

CROSS-REFERENCE TO RELATED APPLICATIONS UNDER 35 U.S.C. § 119

This application claims priority to Provisional Patent Application No. 62/710,308, filed on Feb. 16, 2018, entitled "TECHNIQUES AND APPARATUSES FOR A RESOURCE ALLOCATION FOR A SHORT TRANSMISSION TIME INTERVAL (STTI) SYSTEM" which is hereby expressly incorporated by reference herein.

FIELD OF THE DISCLOSURE

Aspects of the present disclosure generally relate to wireless communication, and more particularly to techniques and apparatuses for a resource allocation for a short transmission time interval (sTTI) system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a wireless communication device, may include identifying that a last resource block of a resource allocation for a physical downlink shared channel (PDSCH) is in a last allocable resource block group (RBG); and determining whether one or more additional resource blocks, subsequent to the last resource block, are included in the resource allocation for the PDSCH based at least in part on at least one of a reference signal type associated with the PDSCH, a quantity of the one or more additional resource blocks, or a downlink control information (DCI) format of the resource allocation.

In some aspects, a wireless communication device for wireless communication may include memory and one or more processors operatively coupled to the memory. The memory and the one or more processors may be configured to identify that a last resource block of a resource allocation for a PDSCH is in a last allocable RBG; and determine whether one or more additional resource blocks, subsequent to the last resource block, are included in the resource allocation for the PDSCH based at least in part on at least one of a reference signal type associated with the PDSCH, a quantity of the one or more additional resource blocks, or a DCI format of the resource allocation.

In some aspects, a non-transitory computer-readable medium may store one or more instructions for wireless communication. The one or more instructions, when executed by one or more processors of a wireless communication device, may cause the one or more processors to identify that a last resource block of a resource allocation for a PDSCH is in a last allocable RBG; and determine whether one or more additional resource blocks, subsequent to the last resource block, are included in the resource allocation for the PDSCH based at least in part on at least one of a reference signal type associated with the PDSCH, a quantity of the one or more additional resource blocks, or a DCI format of the resource allocation.

In some aspects, an apparatus for wireless communication may include means for identifying that a last resource block of a resource allocation for a PDSCH is in a last allocable RBG; and means for determining whether one or more additional resource blocks, subsequent to the last resource block, are included in the resource allocation for the PDSCH based at least in part on at least one of a reference signal type associated with the PDSCH, a quantity of the one or more additional resource blocks, or a DCI format of the resource allocation.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7, 8A, 8B, and 9-11 are diagrams illustrating one or more examples of a resource allocation for a short transmission time interval system, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
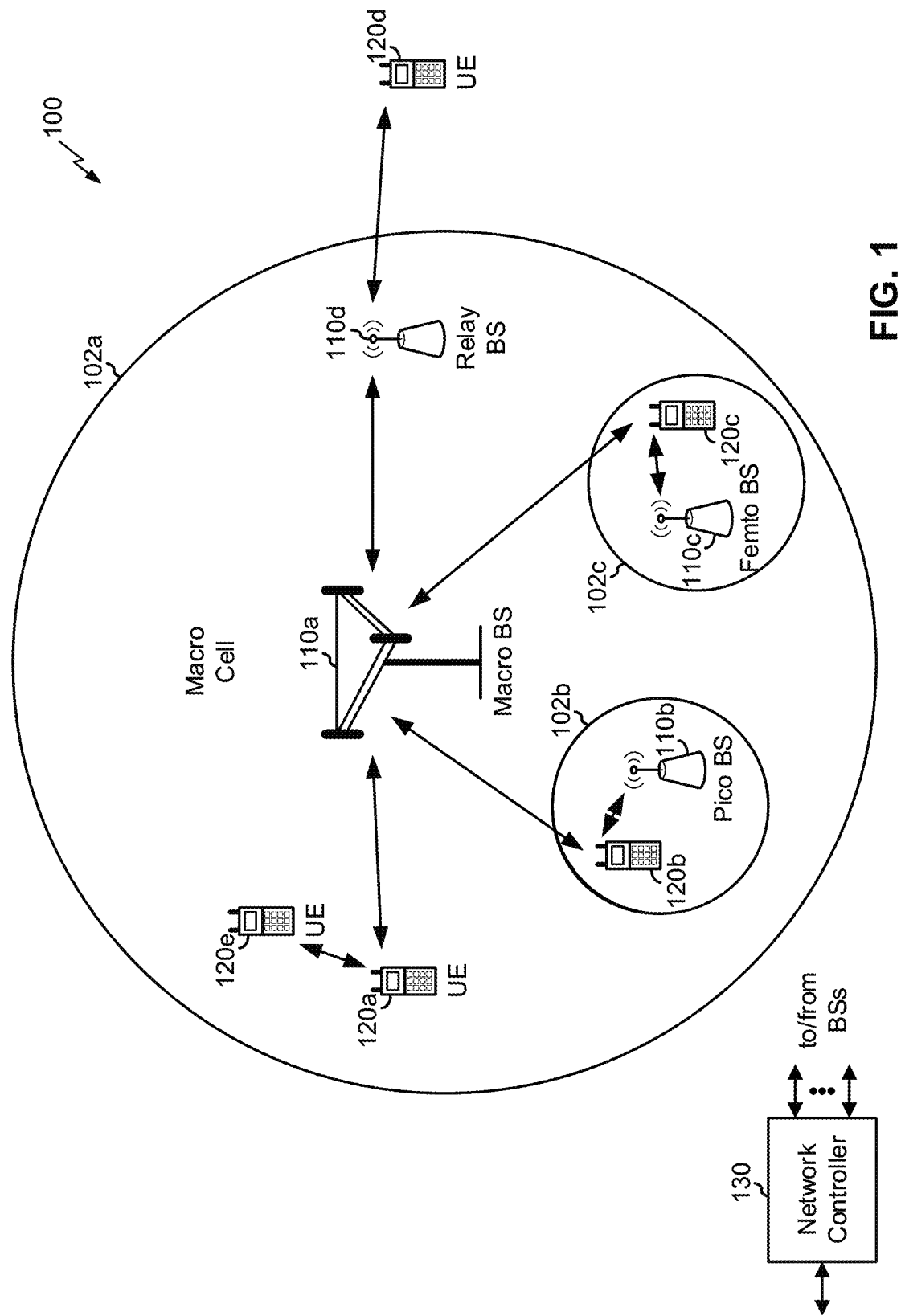
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, a smart meter or sensor, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband IoT) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
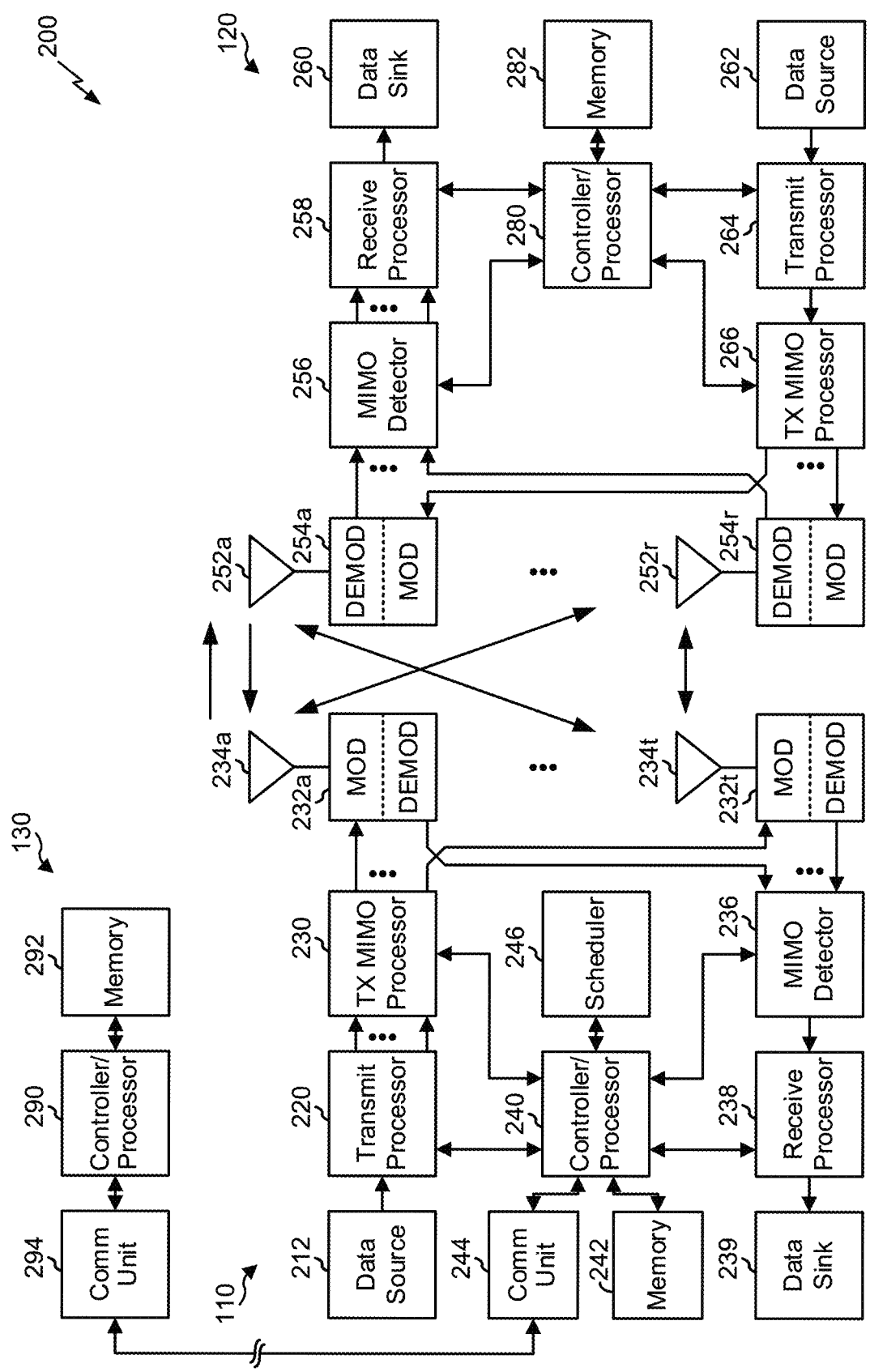
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with a resource allocation for a short transmission time interval system, as described in more detail elsewhere herein. For example, controller/processor 240 of base station 110, controller/processor 280 of UE 120, and/or any other component(s) of FIG. 2 may perform or direct operations of, for example, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, a wireless communication device (e.g., UE 120 and/or base station 110) may include means for identifying that a last resource block of a resource allocation for a PDSCH is in a last allocable RBG; means for determining whether one or more additional resource blocks, subsequent to the last resource block, are included in the resource allocation for the PDSCH based at least in part on at least one of a reference signal type associated with the PDSCH, a quantity of the one or more additional resource blocks, or a DCI format of the resource allocation, and/or the like. In some aspects, such means may include one or more components of the wireless communication device, such as one or more components of UE 120 and/or BS 110, described in connection with FIG. 2.

As indicated above, FIG. 2 is provided merely as an example. Other examples may differ from what is described with regard to FIG. 2.

Figure 3A:
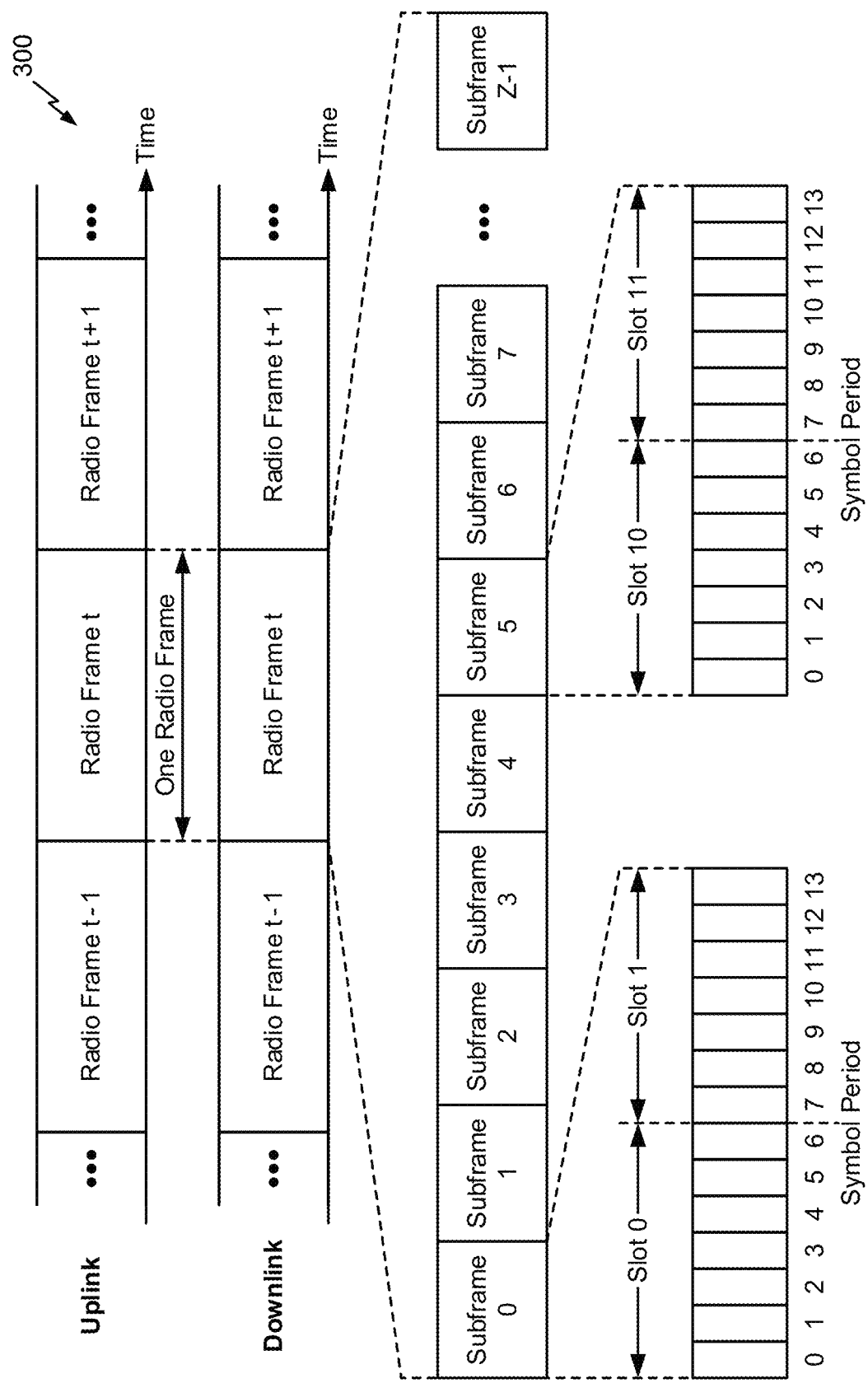
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
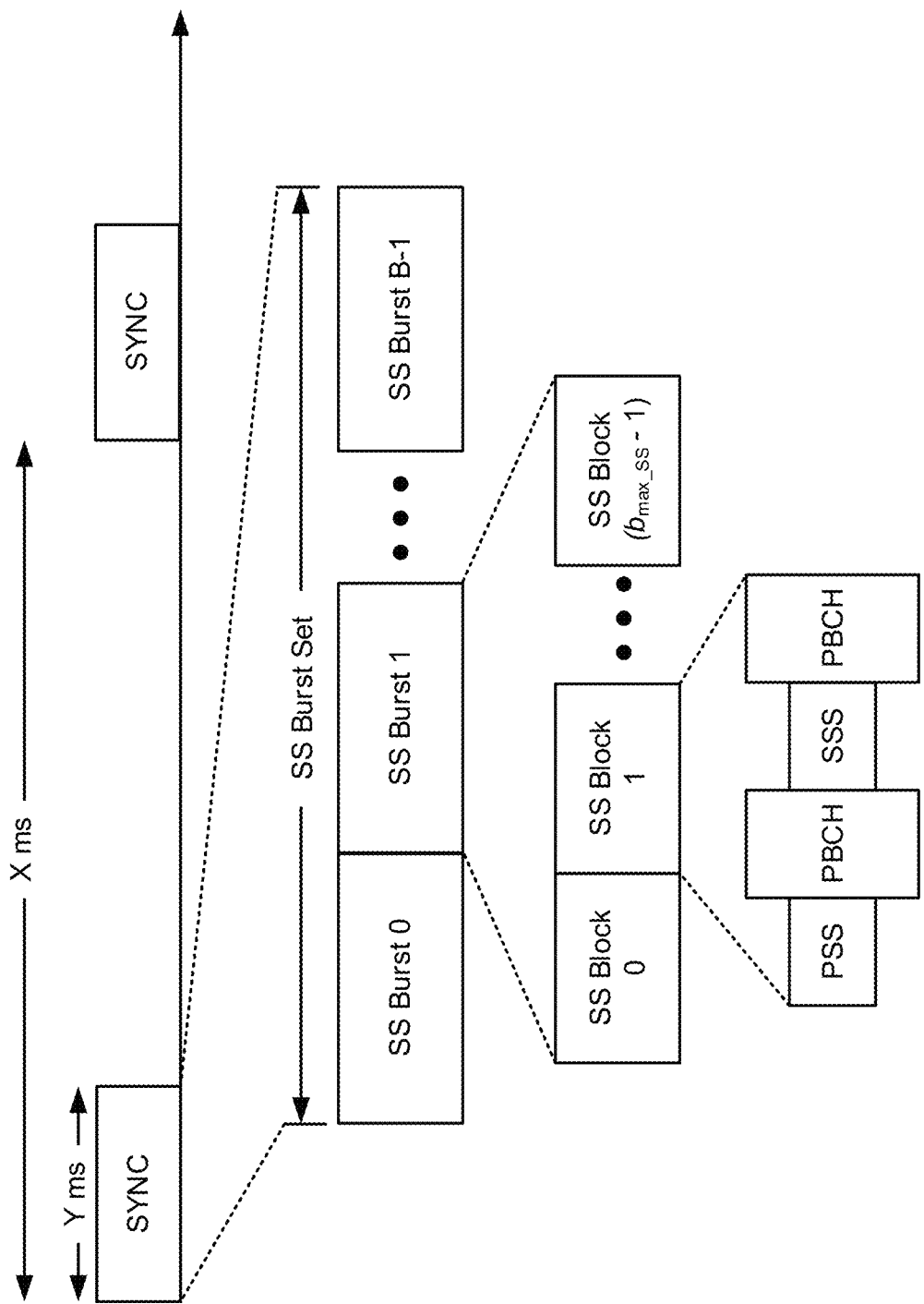
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBS) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples may differ from what is described with regard to FIGS. 3A and 3B.

Figure 4:
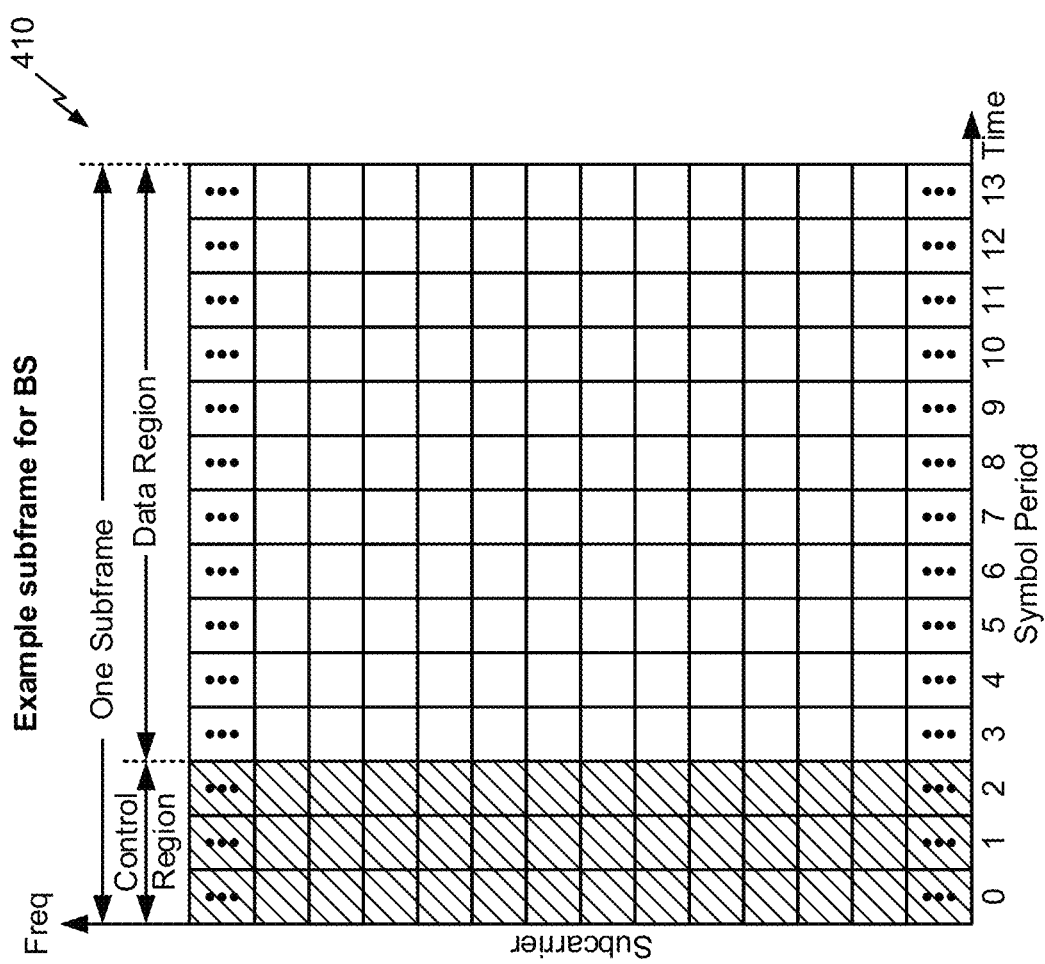
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunication systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

Figure 5:
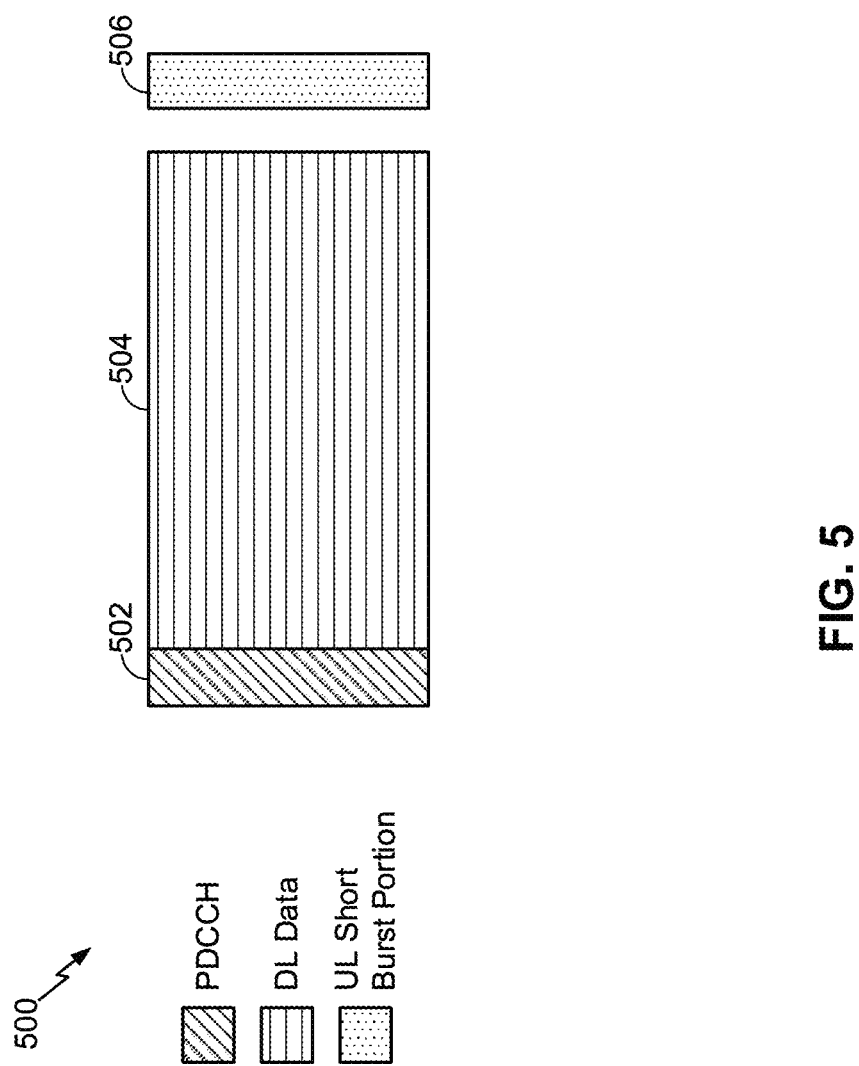
FIG. 5 is a diagram illustrating an example of a downlink (DL)-centric subframe, in accordance with various aspects of the present disclosure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. In some aspects, the control portion 502 may include legacy PDCCH information, shortened PDCCH (sPDCCH) information), a control format indicator (CFI)

value (e.g., carried on a physical control format indicator channel (PCFICH)), one or more grants (e.g., downlink grants, uplink grants, and/or the like), and/or the like.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a PDSCH.

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an acknowledgment (ACK) signal (e.g., a physical uplink control channel (PUCCH) ACK, a physical uplink shared channel (PUSCH) ACK, an immediate ACK), a negative acknowledgment (NACK) signal (e.g., a PUCCH NACK, a PUSCH NACK, an immediate NACK), a scheduling request (SR), a buffer status report (BSR), a hybrid automatic repeat request indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples may differ from what is described with regard to FIG. 5.

Figure 6:
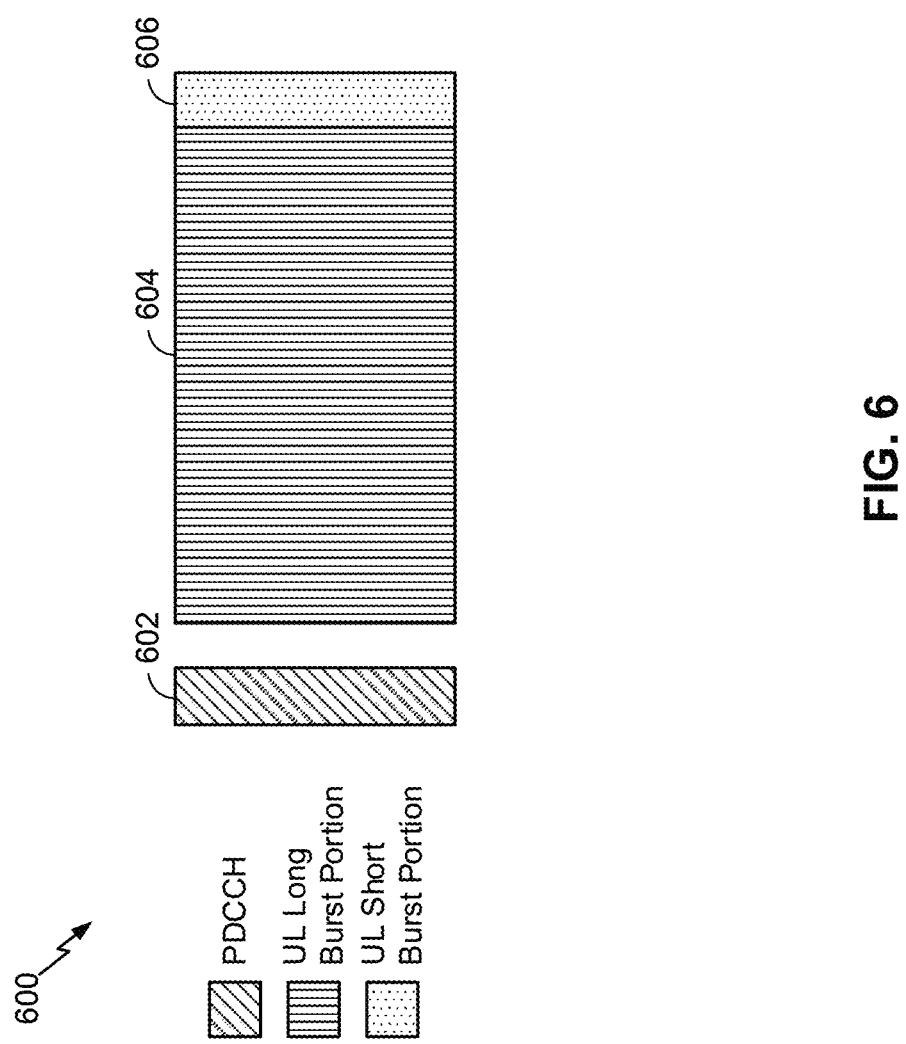
FIG. 6 is a diagram illustrating an example of an uplink (UL)-centric subframe, in accordance with various aspects of the present disclosure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure, and alternative structures having similar features may exist without necessarily deviating from the aspects described herein.

According to some aspects, one or more additional resource blocks of bandwidth may be included within a resource allocation for the PDSCH based at least in part on a reference signal type associated with the PDSCH and/or a bandwidth of the resource allocation.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some aspects, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples may differ from what is described with regard to FIG. 6.

In many instances, resource blocks of a communication system are to be allocated according to a standard or a technical agreement. For example, for resource allocation type 2 (RAT2) for shortened time transmission interval (sTTI), resource blocks are to be allocated in a particular manner (e.g., using a particular starting granularity or resource block group (RBG) size) based at least in part on a bandwidth of the communication system. In some instances, rules or procedures of one standard or technical agreement for one practice can conflict with rules or procedures of another communication standard or technical agreement. For example, the above standard for RAT2 for sTTI can allow for an odd number of resource blocks to be included within a last resource block group of a resource allocation for a PDSCH. However, there may be a technical agreement that a size of precoding resource block group (PRG) is to have a size of two resource blocks, and that a demodulation reference signal (DMRS)-based PDSCH is not to be mapped to a PRG with an isolated resource block (which occurs when there is an odd number of resource blocks in a RBG). Accordingly, for a communication system having a certain bandwidth, the standard for RAT2 for sTTI can conflict with the technical agreement for a PRG size in a DMRS-based communication system.

Accordingly, in some aspects described herein, a wireless communication device may identify that a last resource block of a resource allocation for a PDSCH is in a last allocable RBG of a resource allocation and determine whether one or more additional resource blocks are included in the resource allocation based at least in part on a reference signal (RS) type (e.g., cell-specific reference signal (CRS), DMRS, or otherwise) associated with the PDSCH, a quantity of the one or more additional resource blocks, a system bandwidth, and/or the like. Furthermore, according to some aspects described herein, a wireless communication device may fully utilize available bandwidth of a resource allocation by determining that additional resource blocks subsequent to the last allocable RBG are included and/or are to be included in a resource allocation. Accordingly, some examples herein increase allocated bandwidth and/or throughput by utilizing unused bandwidth (e.g., additional resources in blocks in sTTI). Accordingly, increasing the bandwidth can improve performance and utilization of resource blocks in resource allocations, enabling conservation of other computing and/or network resources (e.g., less transmissions may be required).

Figure 7:
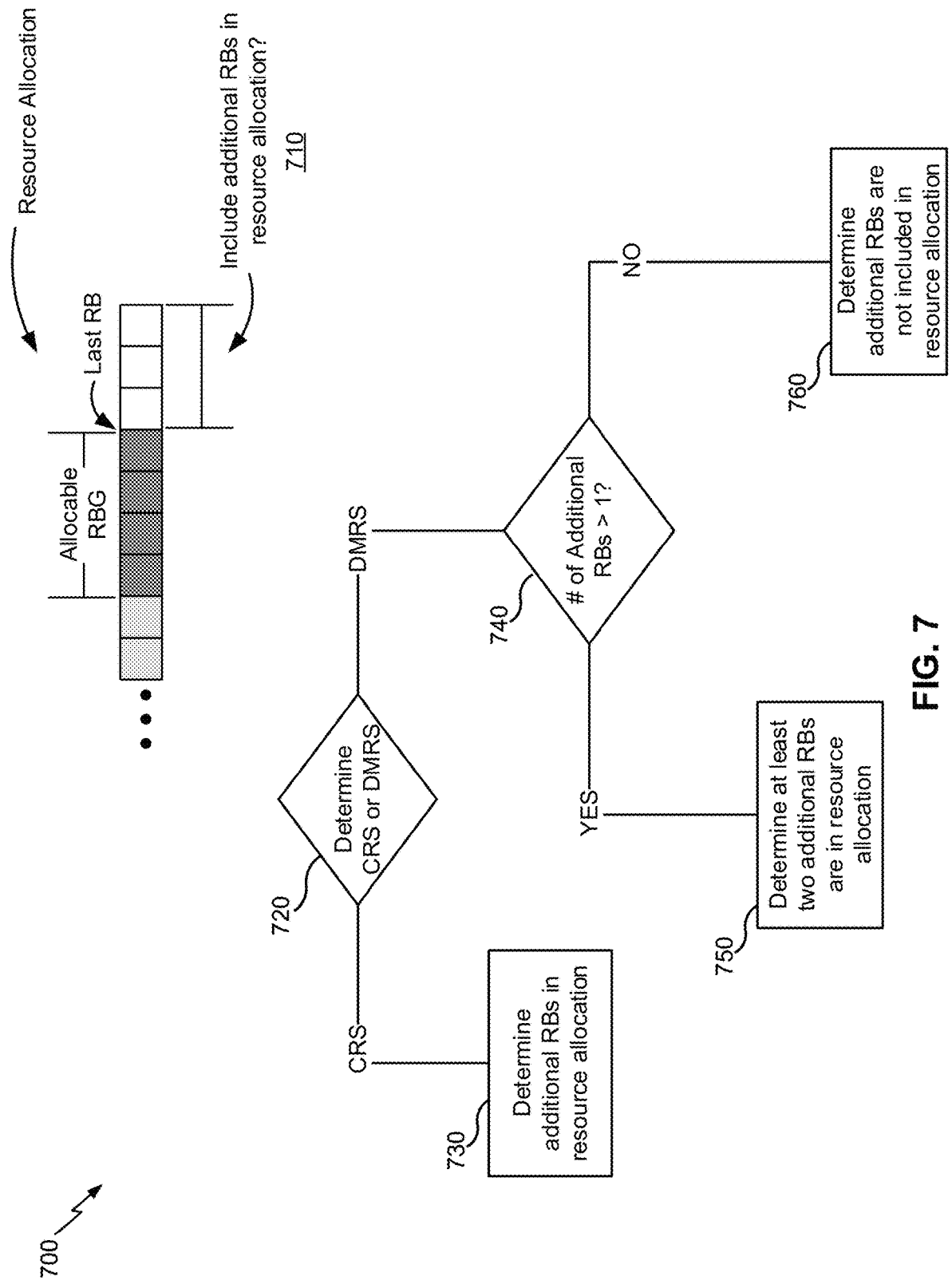

FIG. 7 is a diagram illustrating an example 700 of a resource allocation for a short transmission time interval system, in accordance with various aspects of the present disclosure. The example 700 of FIG. 7 includes an example resource allocation analysis that can be performed by a wireless communication device to determine whether additional resource blocks subsequent to a last resource block of a last allocable resource block group (RBG) are included in a resource allocation for a PDSCH. As shown by reference number 710, a wireless communication device may determine whether additional resource blocks (RBs) of a bandwidth are to be included in the resource allocation.

As shown in FIG. 7, and by reference number 720, a wireless communication device may determine, for a resource allocation, whether a PDSCH of the resource allocation is signaled (e.g., by a PDCCH or sPDCCH) by a cell-specific reference signal (CRS) or by a DMRS. In some aspects, the wireless communication device may determine the reference signal type (e.g., CRS or DMRS) based at least in part on a downlink control information format employed to communicate the resource allocation (e.g., which may be indicated in a PDCCH or sPDCCH). For example, PDCCH/SPDCCH Formats 7-1A, 7-1B, 7-1C, and 7-1D may be used for a CRS transmission mode, whereas PDCCH/SPDCCH Formats 7-1E, 7-1F, and 7-1G may be used for a DMRS transmission mode.

As shown by reference number 730 of FIG. 7, if the wireless communication device determines that the resource allocation is signaled using CRS, the wireless communication device may determine that additional resource blocks subsequent to a last allocable RBG of a resource allocation are included in the resource allocation. In some aspects, the wireless communication device may determine that the additional resource blocks are included in a last allocable RBG of the resource allocation.

In example 700 of FIG. 7, if the wireless communication device determines that the resource allocation is signaled using DMRS, the wireless communication device, as shown by reference number 740, may determine a quantity of the additional resource blocks. For example, as shown in FIG. 7, if the quantity of the additional resource blocks is greater than one, the wireless communication device may determine that at least two additional RBs are included in the resource allocation, as shown by reference number 750. On the other hand, if the wireless communication device determines that the number of additional resource blocks is not great than one, the wireless communication device may determine that the additional resource blocks are not to be included in the resource allocation, as shown by reference number 760.

According to some examples, the wireless communication device may determine the quantity of the additional resource blocks based at least in part on an index of the last resource block of a last allocable RBG and a bandwidth of the resource allocation. In some aspects, the index of the last resource block may depend on the bandwidth of the resource allocation and a starting point granularity and RBG size corresponding to the bandwidth of the resource allocation.

Additionally, or alternatively, a wireless communication device may determine whether the quantity of the additional resource blocks is greater than one, the wireless communication device may determine whether the quantity of the one or more additional resource blocks is divisible by a size of a PRG, associated with the DMRS, or greater than a size of the PRG. In some aspects, the wireless communication device may determine whether a quantity of the one or more additional resource blocks is an integer multiple of a size of a PRG, expressed in number of resource blocks (e.g., an even number if PRG size is 2), whether the quantity of the one or more additional resource blocks is a non-integer multiple of a size of a PRG, expressed in number of resource blocks, greater than the PRG size (e.g., an odd number greater than two if PRG size is 2), whether the quantity of the one or more additional resource blocks is a non-integer multiple of a size of a PRG, expressed in number of resource blocks, less than the PRG size (e.g., an odd number less than two if PRG size is 2), and/or the like. Accordingly, based at least in part on the determined quantity of additional resource blocks, the wireless communication device can determine whether additional resource blocks are included in a resource allocation (or included within a last allocable RBG of a resource allocation).

Accordingly, an example wireless communication device may utilize and/or determine that additional resource blocks of a bandwidth are included in a resource allocation of that bandwidth and/or in a last RBG of the resource allocation. As such, the wireless communication device may achieve greater bandwidth under sTTI, thus increasing performance through efficient use of the bandwidth. In aspects, the present methods may be employed for communication using one or more sTTIs. In aspects, two such transmission time intervals (TTIs) may have different TTI lengths.

As indicated above, FIG. 7 is provided as an example. Other examples may differ from what is described with respect to FIG. 7.

Figure 8A:
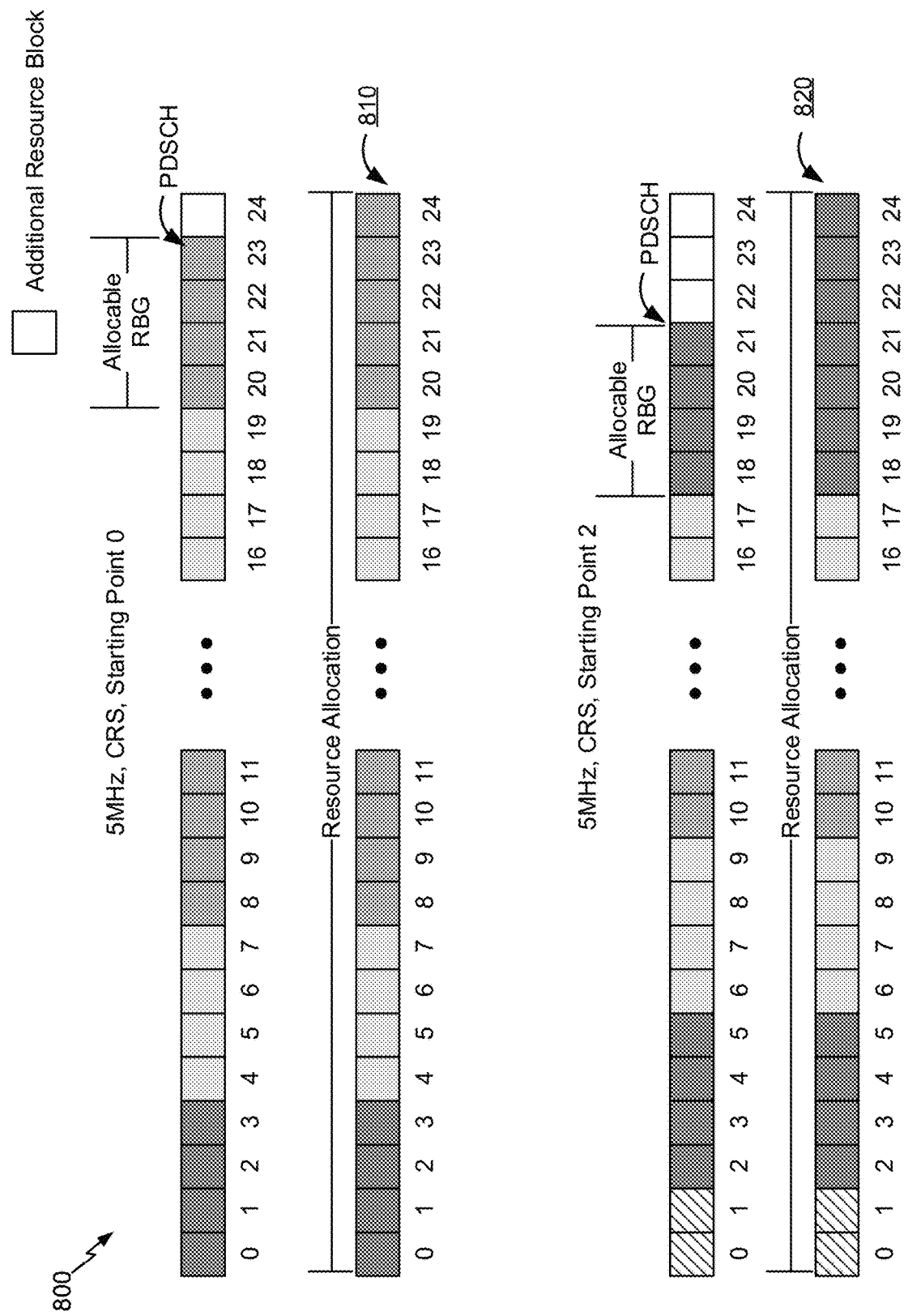
Figure 8B:
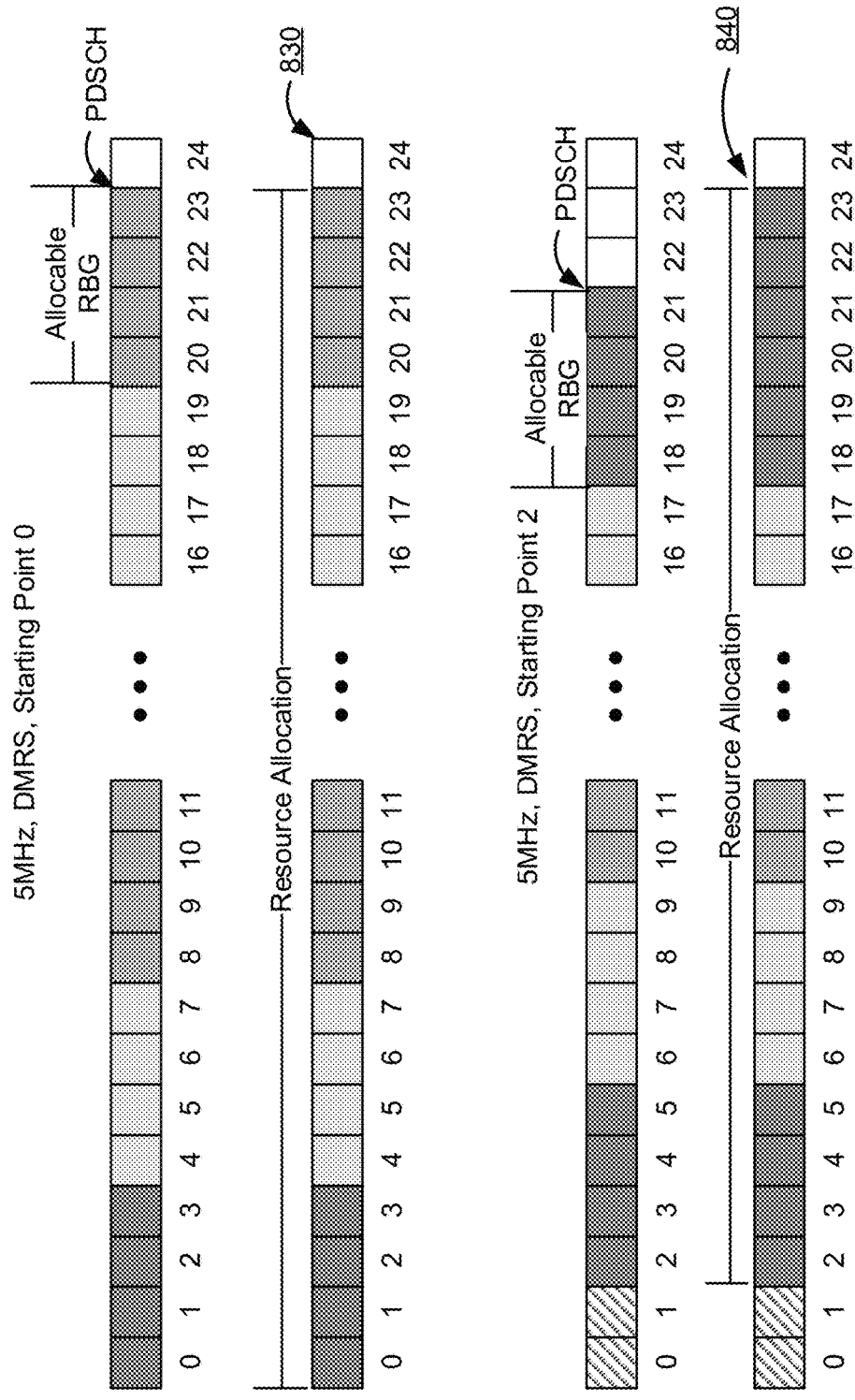

FIGS. 8A and 8B are diagrams illustrating an example 800 of a resource allocation for a short transmission time interval system, in accordance with various aspects of the present disclosure. In example 800, a resource allocation, with a bandwidth of 5 MHz, is shown according to examples described herein. In example 800, the resource allocations have an index from 0-24, a starting point of Index 0 or Index 2, a starting point granularity of two blocks, and an RBG size of four blocks. Accordingly, for the parameters of example 800, a wireless communication device may determine that a quantity of the additional resource blocks can be one or three depending on the starting point.

As shown in FIG. 8A and by reference number 810, when a PDSCH is mapped to index 23 in the example 800, the wireless communication device may determine that one additional resource block at index 24 of the bandwidth is included in the resource allocation when the reference signal type is a CRS type. As shown by reference number 820, when a PDSCH is mapped to index 21 in the example 800, the wireless communication device may determine that three additional resource blocks at index 22, index 23, and index 24 of the bandwidth are included in the resource allocation when the reference signal type is a CRS type. Accordingly, in a 5 MHz communication system, bandwidth can be increased by at least 4% using CRS.

As shown in FIG. 8B and by reference number 830, when a PDSCH is mapped to index 23 in the example 800, the wireless communication device may determine that an additional resource block at index 24 of the bandwidth is not included in the resource allocation when the reference signal type is a DMRS type. In such a case, the resource block at index 24 may not be included because a last RBG would include an isolated RB due to a PRG size of two. As shown by reference number 840, when a PDSCH is mapped to index 21 in the example 800, the wireless communication device may determine that two additional resource blocks at index 22 and index 23 of the bandwidth are included in the resource allocation when the reference signal type is a DMRS type. The two additional resource blocks may be included based at least in part on a PRG size of two corresponding to the DMRS, enabling the two additional resource blocks to be included in the resource allocation. Accordingly, in a 5 MHz communication system, bandwidth can be increased by at least 8% using DMRS when the starting point is index 2 (depending on whether the resource blocks of index 0 and index 1 are used).

As indicated above, FIGS. 8A and 8B are provided as an example. Other examples may differ from what is described with respect to FIGS. 8A and 8B.

Figure 9:
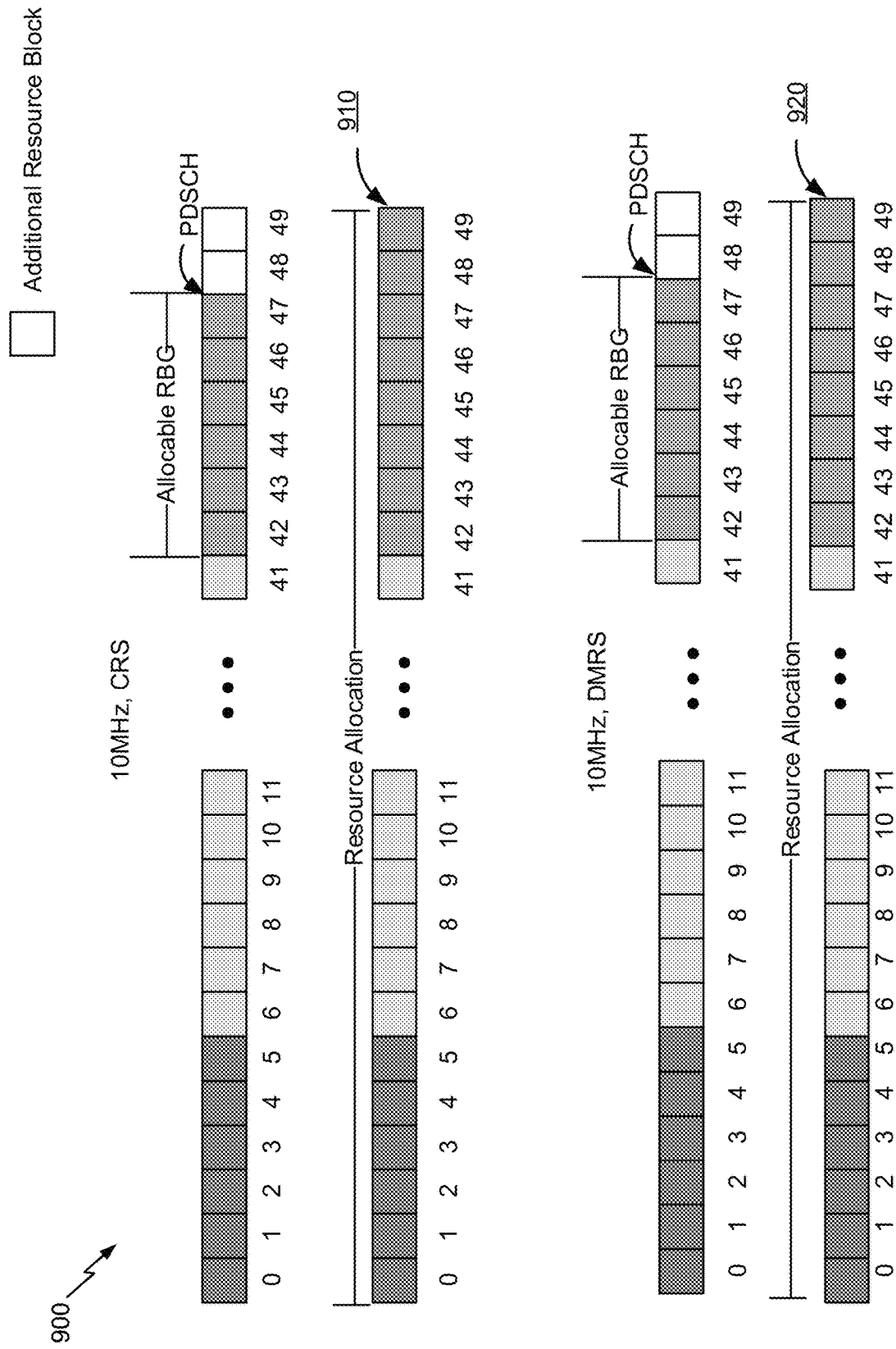

FIG. 9 is a diagram illustrating an example of a resource allocation for a short transmission time interval system, in accordance with various aspects of the present disclosure. In example 900, a resource allocation, with a bandwidth of 10 MHz, is shown according to examples described herein. In example 900, the resource allocations have an index from 0-49, a starting point of Index 0, a starting point granularity of six blocks, and an RBG size of six blocks. Accordingly, for the parameters of example 900, a wireless communication device may determine that a quantity of the additional resource blocks is two.

As shown by reference number 910, when a PDSCH is mapped to index 47 in the example 900, the wireless communication device may determine that two additional resource blocks at index 48 and index 49 of the bandwidth are included in the resource allocation when the reference signal type is a CRS type. As shown by reference number 920, when a PDSCH is mapped to index 47 in the example 900, the wireless communication device may determine that two additional resource blocks at index 48 and index 49 of the bandwidth are included in the resource allocation when the reference signal type is a DMRS type. Accordingly, in a 10 MHz communication system, bandwidth can be increased by at least 4% using CRS or DMRS.

As indicated above, FIG. 9 is provided as an example. Other examples may differ from what is described with respect to FIG. 9.

Figure 10:
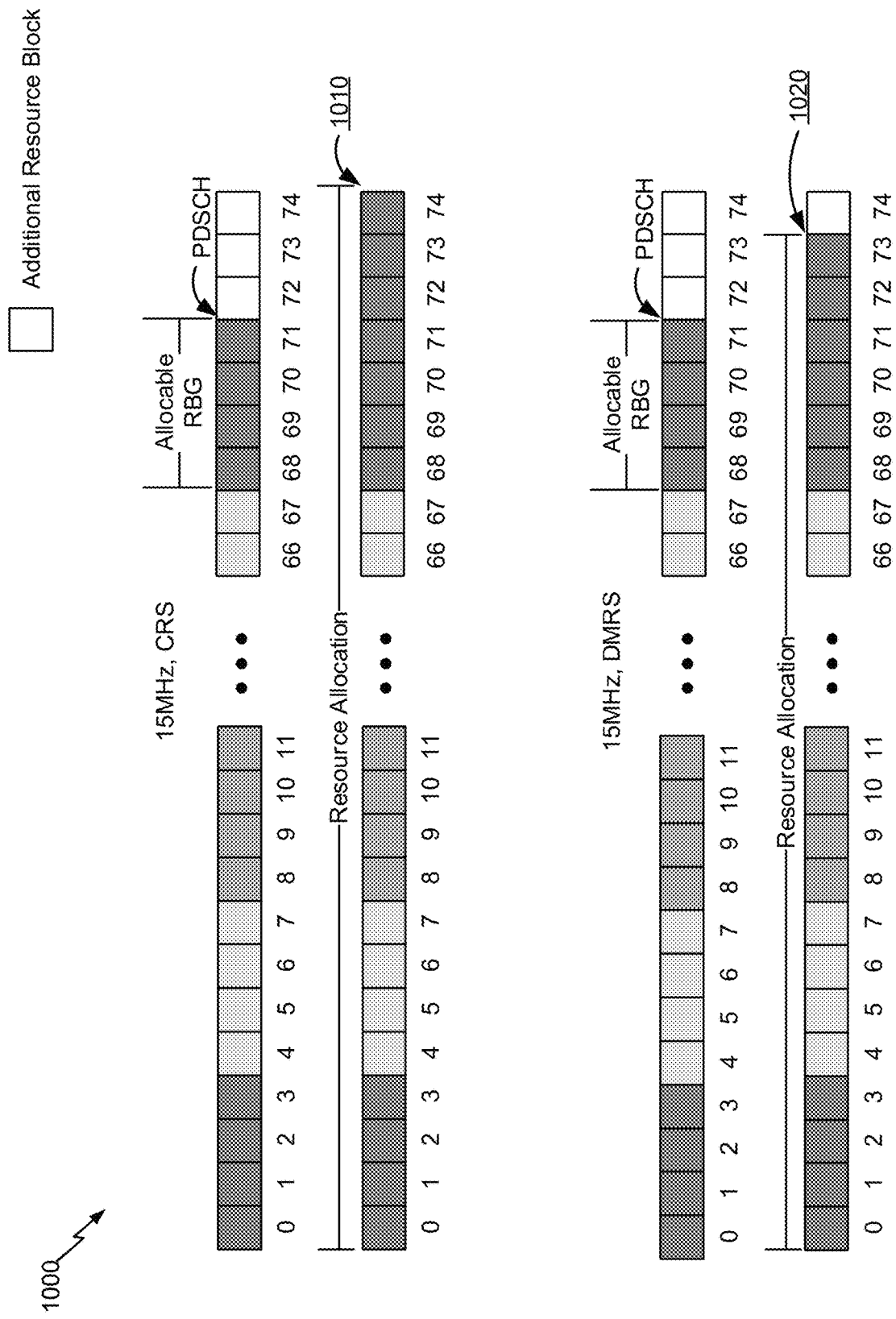

FIG. 10 is a diagram illustrating an example of a resource allocation for a short transmission time interval system, in accordance with various aspects of the present disclosure. In example 1000, a resource allocation, with a bandwidth of 15 MHz, is shown according to examples described herein. In example 1000, the resource allocations have an index from 0-74, a starting point of Index 0, a starting point granularity of four blocks, and an RBG size of four blocks. Accordingly, for the parameters of example 1000, a wireless communication device may determine that a quantity of the additional resource blocks is three.

As shown by reference number 1010, when a PDSCH is mapped to index 71 in the example 1000, the wireless communication device may determine that three additional resource blocks at index 72, index 73, and index 74 of the bandwidth are included in the resource allocation when the reference signal type is a CRS type. Accordingly, in a 15 MHz communication system, bandwidth can be increased by at least 4% using CRS. As shown by reference number 1020, when a PDSCH is mapped to index 71 in the example 1000, the wireless communication device may determine that two additional resource blocks at index 72 and index 73 of the bandwidth are included in the resource allocation when the reference signal type is a DMRS type. In such a case, only two additional resource blocks are included in the resource allocation based at least in part on a PRG size of two corresponding to the DMRS. However, in a 15 MHz communication system, bandwidth can be increased by approximately 2.7% using DMRS.

As indicated above, FIG. 10 is provided as an example. Other examples may differ from what is described with respect to FIG. 10.

FIG. 11 is a diagram illustrating an example 1100 of a resource allocation for a short transmission time interval system, in accordance with various aspects of the present disclosure. FIG. 11 includes an example results analysis 1110 for certain bandwidths (e.g., 5 MHz, 10 MHz, and 15 MHz) of a communication system. The example results analysis shows parameters that may be considered and/or analyzed to determine whether additional blocks of a resource allocation are included in the resource allocation (e.g., or if a PDSCH is mapped to the additional resource blocks of the resource allocation).

As shown in FIG. 11, the example parameters can include a number of resource blocks of the resource allocation, an index range of the resource allocation, an RBG size of the resource allocation, a starting point granularity of the RBG size, a DMRS PRG size, a determined index value of a last resource block of a last RBG, and a determined number of additional resource blocks. As shown, a wireless communication device may determine whether additional resource blocks are to be included in a resource allocation, and if so, how many additional resource blocks (e.g., based at least in part on the RS type and a quantity of additional resource blocks).

As indicated above, FIG. 11 is provided as an example. Other examples may differ from what is described with respect to FIG. 11.

Figure 12:
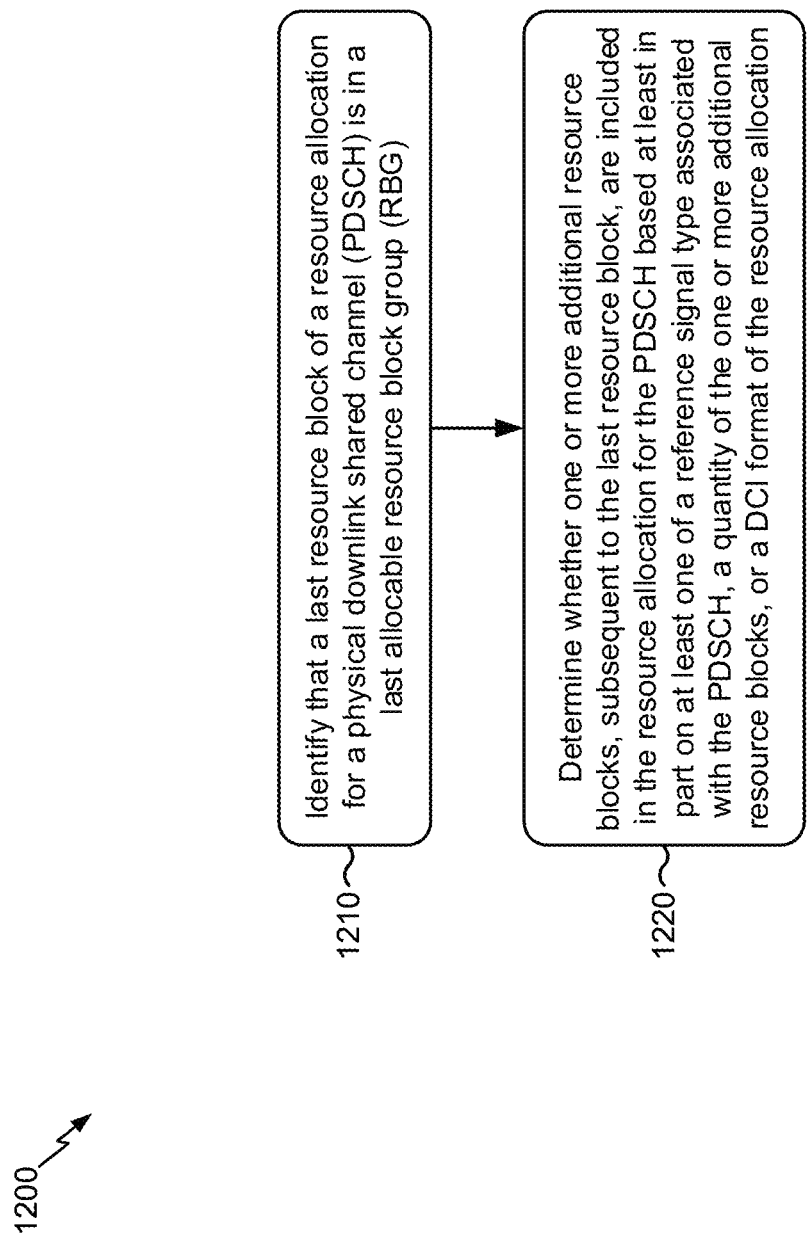
FIG. 12 is a diagram illustrating an example process performed, for example, by a wireless communication device, in accordance with various aspects of the present disclosure.

FIG. 12 is a diagram illustrating an example process 1200 performed, for example, by a wireless communication device, in accordance with various aspects of the present disclosure. Example process 1200 is an example where a wireless communication device (e.g., BS 110, UE 120, and/or the like) performs a resource allocation determination for a short transmission time interval system.

As shown in FIG. 12, in some aspects, process 1200 may include identifying a last resource block of a resource allocation for a physical downlink shared channel (PDSCH) is in a last allocable resource block group (RBG) (block 1210). For example, a wireless communication device (e.g., using transmit processor 220, receive processor 238, controller/processor 240, receive processor 258, transmit processor 264, controller/processor 280, and/or the like) may identify the last resource block of the resource allocation for the PDSCH. In some aspects, the wireless communication device may identify the last resource block to enable the wireless communication device to determine whether one or more additional resource blocks are included in the resource allocation for the PDSCH.

As shown in FIG. 12, in some aspects, process 1200 may include determining whether one or more additional resource blocks, subsequent to the last resource block, are included in the resource allocation for the PDSCH based at least in part on at least one of a reference signal type associated with the PDSCH, a quantity of the one or more additional resource blocks, or a DCI format of the resource allocation (block 1220). For example, a wireless communication device (e.g., using transmit processor 220, receive processor 238, controller/processor 240, receive processor 258, transmit processor 264, controller/processor 280, and/or the like) may determine whether the one or more additional resource blocks are included in the resource allocation. In some aspects, the wireless communication device may determine whether the one or more additional resource blocks are included in the resource allocation based at least in part on identifying the last block of the resource allocation.

Process 1200 may include additional aspects, such as any single aspect and/or any combination of aspects described below and/or in connection with one or more other processes described elsewhere herein.

In some aspects, the wireless communication device is configured to determine whether the quantity of the one or more additional resource blocks comprises one additional resource block, two additional resource blocks, or three additional resource blocks based at least in part on a bandwidth of a communication system associated with the wireless communication device. In some aspects, the wireless communication device, when determining whether the one or more additional resource blocks, subsequent to the last resource block, are included in the resource allocation for the PDSCH, is configured to determine whether the quantity of the one or more additional resource blocks is less than a size of an RBG corresponding to a bandwidth of the resource allocation.

In some aspects, the wireless communication device, when determining whether the one or more additional resource blocks, subsequent to the last resource block, are included in the resource allocation for the PDSCH, is configured to determine whether the quantity of the one or more additional resource blocks is divisible by a precoding resource block group (PRG) size or is greater than the PRG size.

In some aspects, when the reference signal type associated with the PDSCH is a cell-specific reference signal (CRS) type, the wireless communication device is configured to determine that the one or more additional resource blocks are included in the resource allocation.

In some aspects, when the reference signal type associated with the PDSCH is a demodulation reference signal (DMRS) type, the wireless communication device is configured to determine at least two of the one or more additional resource blocks are included in the resource allocation when an index of the last resource block and a bandwidth, associated with a communication system of the wireless communication device, indicate that there are at least two additional resource blocks available for resource allocation.

In some aspects, an index of the last resource block of the last allocable RBG is based at least in part on a resource block group (RBG) size associated with the resource allocation and a starting point of the resource allocation; and the RBG size and the starting point of the resource allocation are based at least in part on a bandwidth associated with a communication system of the wireless communication device.

In some aspects, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 23 of the bandwidth, the wireless communication device is configured to determine that a resource block at index 24 of the bandwidth is included in the resource allocation when the reference signal type is a cell-specific reference signal (CRS) type.

In some aspects, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 23 of the bandwidth, the wireless communication device is configured to determine that a resource block at index 24 of the bandwidth is not included in the resource allocation when the reference signal type is not a cell-specific reference signal (CRS) type.

In some aspects, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 21 of the bandwidth, the wireless communication device is configured to determine that resource blocks at index 22, index 23, and index 24 of the bandwidth are included in the resource allocation when the reference signal type is a cell-specific reference signal (CRS) type.

In some aspects, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 21 of the bandwidth, the wireless communication device is configured to determine that resource blocks at index 22 and index 23 of the bandwidth are included in the resource allocation when the reference signal type is a demodulation reference signal (DMRS) type.

In some aspects, when a bandwidth of a communication system associated with the wireless communication device is 10 MHz or a downlink bandwidth configuration, expressed in number of resource blocks, has an index value in a range from 27 to 63, and the resource allocation indicates the PDSCH is mapped to a resource block at index 47 of the bandwidth, the wireless communication device is configured to determine that resource blocks at index 48 and index 49 of the bandwidth are included in the resource allocation when the reference signal type is a cell-specific reference signal (CRS) type or a demodulation reference signal (DMRS) type.

In some aspects, when a bandwidth of a communication system associated with the wireless communication device is 15 MHz or a downlink bandwidth configuration, expressed in number of resource blocks, has an index value in a range from 64 to 75, and the resource allocation indicates the PDSCH is mapped to a resource block at index 71 of the bandwidth, the wireless communication device is configured to determine that resource blocks at index 72, index 73, and index 74 of the bandwidth are included in the resource allocation when the reference signal type is a cell-specific reference signal (CRS) type.

In some aspects, when a bandwidth of a communication system associated with the wireless communication device is 15 MHz or a downlink bandwidth configuration, expressed in number of resource blocks, has an index value in a range from 64 to 75, and the resource allocation indicates the PDSCH is mapped to a resource block at index 71 of the bandwidth, the wireless communication device is configured to determine that resource blocks at index 72 and index 73 of the bandwidth are included in the resource allocation when the reference signal type is a demodulation reference signal (DMRS) type.

In some aspects, the wireless communication device comprises a user equipment. In some aspects, the wireless communication device comprises a base station (BS). In some aspects, the one or more additional resource blocks are included in the last RBG of the resource allocation.

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation, is configured to determine the quantity of the one or more additional resource blocks is an integer multiple of a size of a precoding resource block group (PRG), expressed in number of resource blocks (e.g., an even number).

In some aspects, the wireless communication device is configured to determine the one or more additional resource blocks are included in the resource allocation for the PDSCH.

In some aspects, the wireless communication device, when determining whether the one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation includes, is configured to determine the quantity of the one or more additional resource blocks is a non-integer multiple of a size of a PRG, expressed in number of resource blocks, greater than the PRG size (e.g., an odd number greater than two if PRG size is 2).

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation, is configured to determine the reference signal type is a cell-specific reference signal (CRS) type. In some aspects, the wireless communication device is configured to determine the one or more additional resource blocks are included in the resource allocation for the PDSCH.

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation, is configured to determine the reference signal type is a demodulation reference signal (DMRS) type. In some aspects, the wireless communication device may further determine how many of the one or more additional resource blocks are included in the resource allocation for the PDSCH. For example, the wireless communication device may be configured to perform one or more modulo operations to determine how many of the one or more additional resource blocks are included in the resource allocation for the PDSCH. For example, the wireless communication device may determine a downlink bandwidth configuration modulo resource block group (RBG) size. (e.g., to determine a number of the one or more additional resource blocks, assuming a starting point index is 0). In aspects, the downlink bandwidth configuration may be $N_{RB}^{DL}$, expressed in multiples of $N_{sc}^{RB}$, where $N_{sc}^{RB}$ is resource block size in the frequency domain, expressed as a number of subcarriers. Based on such operation the wireless communication device may determine whether one or more additional resource blocks, subsequent to the last resource block, are included in the resource allocation for the PDSCH. Assuming the result of X modulo PRG size is Y, the wireless communication device may determine whether one or more additional resource blocks, subsequent to the last resource block, are included in the resource allocation for the PDSCH based on Y. For example, in aspects, all but the last Y resource blocks are included in the resource allocation for the PDSCH (e.g., when the reference signal type is DMRS type). Now, assume X is the number of remaining RBs after taking the modulo of the number of RBs in the system bandwidth and the RBG. Then, for DMRS-based PDSCH, another modulo operation can be performed as X mod PRG size (=2).

In some aspects, the wireless communication device is configured to determine all but a last number of resource blocks less than a size of the PRB, expressed in resource blocks, (e.g., all but a last one of three additional resource blocks when the PRG size is 2) of the one or more additional resource blocks are included in the resource allocation for the PDSCH. For such an exemplary aspect, the PRB size may be 4 or 6, and the PRG size may be 2; and the wireless communication device may determine the number of additional resource blocks modulo PRG size.

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, the DCI format of the resource allocation, a system bandwidth, or a PRG size, is configured to determine the quantity of the one or more additional resource blocks is a non-integer multiple of a size of a PRG, expressed in number of resource blocks, less than the PRG size (e.g., an odd number less than two if PRG size is 2).

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation, is configured to determine the reference signal type is a cell-specific reference signal (CRS) type. In some aspects, the wireless communication device is configured to determine the one or more additional resource blocks are included in the resource allocation for the PDSCH.

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation is configured to determine the reference signal type is a demodulation reference signal (DMRS) type. In some aspects, the wireless communication device is configured to determine the one or more additional resource blocks are not included in the resource allocation for the PDSCH.

In some aspects, the wireless communication device, when determining whether one or more additional resource blocks, subsequent to the last resource block, are included in the resource allocation for the PDSCH based at least in part on at least one of a reference signal type associated with the PDSCH, a quantity of the one or more additional resource blocks, or the DCI format of the resource allocation, is configured to determine the reference signal type associated with the PDSCH based at least in part on a downlink control information format (e.g., a format representative of CRS and/or DMRS) employed to communicate the resource allocation.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based at least in part on" is intended to mean "based, at least in part, on" unless explicitly stated otherwise.

What is claimed is:

1. A method of wireless communication performed by a wireless communication device, comprising:
   identifying that a last resource block of a resource allocation for a physical downlink shared channel (PDSCH) is in a last allocable resource block group (RBG); and
   determining whether one or more additional resource blocks, subsequent to the last resource block, are included in the resource allocation for the PDSCH based at least in part on at least one of a reference signal type associated with the PDSCH, a quantity of the one or more additional resource blocks, or a downlink control information (DCI) format of the resource allocation, wherein, when the reference signal type associated with the PDSCH is a cell-specific reference signal (CRS) type, the wireless communication device is configured to determine that the one or more additional resource blocks are included in the resource allocation.

2. The method of claim 1, wherein the wireless communication device, when determining whether the one or more additional resource blocks, subsequent to the last resource block, are included in the resource allocation for the PDSCH, is configured to determine whether the quantity of the one or more additional resource blocks is less than a size of an RBG corresponding to a bandwidth of the resource allocation.

3. The method of claim 1, wherein the wireless communication device, when determining whether the one or more additional resource blocks, subsequent to the last resource block, are included in the resource allocation for the PDSCH, is configured to determine whether the quantity of the one or more additional resource blocks is divisible by a precoding resource block group (PRG) size or is greater than the PRG size.

4. The method of claim 1, wherein, when the reference signal type associated with the PDSCH is a demodulation reference signal (DMRS) type, the wireless communication device is configured to determine at least two of the one or more additional resource blocks are included in the resource allocation when an index of the last resource block and a bandwidth, associated with a communication system of the wireless communication device, indicate that there are at least two additional resource blocks available for resource allocation.

5. The method of claim 1, wherein:
an index of the last resource block of the last allocable RBG is based at least in part on a resource block group (RBG) size associated with the resource allocation and a starting point of the resource allocation; and
the RBG size and the starting point of the resource allocation are based at least in part on a bandwidth associated with a communication system of the wireless communication device.

6. The method of claim 1, wherein, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 23 of the bandwidth, the wireless communication device is configured to determine that a resource block at index 24 of the bandwidth is included in the resource allocation when the reference signal type is the CRS type.

7. The method of claim 1, wherein, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 23 of the bandwidth, the wireless communication device is configured to determine that a resource block at index 24 of the bandwidth is not included in the resource allocation when the reference signal type is not the CRS type.

8. The method of claim 1, wherein, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 21 of the bandwidth, the wireless communication device is configured to determine that resource blocks at index 22, index 23, and index 24 of the bandwidth are included in the resource allocation when the reference signal type is the CRS type.

9. The method of claim 1, wherein, when a bandwidth of a communication system associated with the wireless communication device is 5 MHz or a downlink bandwidth configuration, expressed in number of resource blocks, has an index value in a range from 20 to 26, and the resource allocation indicates the PDSCH is mapped to a resource block at index 21 of the bandwidth, the wireless communication device is configured to determine that resource blocks at index 22 and index 23 of the bandwidth are included in the resource allocation when the reference signal type is a demodulation reference signal (DMRS) type.

10. The method of claim 1, wherein, when a bandwidth of a communication system associated with the wireless communication device is 10 MHz or a downlink bandwidth configuration, expressed in number of resource blocks, has an index value in a range from 27 to 63, and the resource allocation indicates the PDSCH is mapped to a resource block at index 47 of the bandwidth, the wireless communication device is configured to determine that resource blocks at index 48 and index 49 of the bandwidth are included in the resource allocation when the reference signal type is the CRS type or a demodulation reference signal (DMRS) type.

11. The method of claim 1, wherein, when a bandwidth of a communication system associated with the wireless communication device is 15 MHz or a downlink bandwidth configuration, expressed in number of resource blocks, has an index value in a range from 64 to 75, and the resource allocation indicates the PDSCH is mapped to a resource block at index 71 of the bandwidth, the wireless communication device is configured to determine that resource blocks at index 72, index 73, and index 74 of the bandwidth are included in the resource allocation when the reference signal type is the CRS type.

12. The method of claim 1, wherein, when a bandwidth of a communication system associated with the wireless communication device is 15 MHz or a downlink bandwidth configuration, expressed in number of resource blocks, has an index value in a range from 64 to 75, and the resource allocation indicates the PDSCH is mapped to a resource block at index 71 of the bandwidth, the wireless communication device is configured to determine that resource blocks at index 72 and index 73 of the bandwidth are included in the resource allocation when the reference signal type is a demodulation reference signal (DMRS) type.

13. The method of claim 1, wherein the wireless communication device comprises a user equipment.

14. The method of claim 1, wherein the wireless communication device comprises a base station (BS).

15. The method of claim 1, wherein the one or more additional resource blocks are included in the last RBG of the resource allocation.

16. The method of claim 1, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation includes determining the quantity of the one or more additional resource blocks is an integer multiple of a size of a precoding resource block group expressed in number of resource blocks.

17. The method of claim 16, wherein the wireless communication device is configured to determine the one or more additional resource blocks are included in the resource allocation for the PDSCH.

18. The method of claim 1, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation includes determining the quantity of the one or more additional resource blocks is a non-integer multiple of a size of a precoding resource block group (PRG), expressed in number of resource blocks, greater than the PRG size.

19. The method of claim 18, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation further includes determining the reference signal type is the CRS type; and
wherein the method further comprises determining the one or more additional resource blocks are included in the resource allocation for the PDSCH.

20. The method of claim 18, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation further includes determining the reference signal type is a demodulation reference signal (DMRS) type; and
wherein the method further comprises determining all but a last number of resource blocks less than the size of the PRG, expressed in resource blocks, of the one or more additional resource blocks are included in the resource allocation for the PDSCH.

21. The method of claim 1, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation includes determining the quantity of the one or more additional resource blocks is a non-integer multiple of a size of a precoding resource block group (PRG), expressed in number of resource blocks, less than the PRG size.

22. The method of claim 21, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation further includes determining the reference signal type is the CRS type; and
wherein the method further comprises determining the one or more additional resource blocks are included in the resource allocation for the PDSCH.

23. The method of claim 21, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation includes determining the reference signal type is a demodulation reference signal (DMRS) type; and
wherein the method further comprises determining the one or more additional resource blocks are not included in the resource allocation for the PDSCH.

24. The method of claim 1, wherein determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation includes determining the reference signal type associated with the PDSCH based at least in part on a downlink control information format employed to communicate the resource allocation.

25. The method of claim 1, wherein, for a reference signal type of a demodulation reference signal (DMRS), determining whether one or more additional resource blocks, subsequent to the last resource block, are included in the resource allocation is based at least in part on a system bandwidth of the wireless communication device and a precoding resource block group (PRG) size of the resource allocation.

26. A wireless communication device for wireless communication, comprising:
a memory; and
one or more processors operatively coupled to the memory, the memory and the one or more processors configured to:
identify that a last resource block of a resource allocation for a physical downlink shared channel (PDSCH) is in a last allocable resource block group (RBG); and
determine whether one or more additional resource blocks, subsequent to the last resource block, are included in the resource allocation for the PDSCH based at least in part on at least one of a reference signal type associated with the PDSCH, a quantity of the one or more additional resource blocks, or a downlink control information (DCI) format of the resource allocation, wherein, when the reference signal type associated with the PDSCH is a cell-specific reference signal (CRS) type, the wireless communication device is configured to determine that the one or more additional resource blocks are included in the resource allocation.

27. The wireless communication device of claim 25, wherein the one or more processors, when determining whether the one or more additional resource blocks, subsequent to the last resource block, are included in the resource allocation for the PDSCH based at least in part on at least one of the reference signal type associated with the PDSCH, the quantity of the one or more additional resource blocks, or the DCI format of the resource allocation, are configured to:
determine whether the quantity of the one or more additional resource blocks is less than a size of an RBG corresponding to a bandwidth of the resource allocation.

28. A non-transitory computer-readable medium storing one or more instructions for wireless communication, the one or more instructions comprising:
one or more instructions that, when executed by one or more processors of a wireless communication device, cause the one or more processors to:
identify that a last resource block of a resource allocation for a physical downlink shared channel (PDSCH) is in a last allocable resource block group (RBG); and
determine whether one or more additional resource blocks, subsequent to the last resource block, are included in the resource allocation for the PDSCH based at least in part on at least one of a reference signal type associated with the PDSCH, a quantity of the one or more additional resource blocks, or a downlink control information (DCI) format of the resource allocation, wherein, when the reference signal type associated with the PDSCH is a cell-specific reference signal (CRS) type, the wireless communication device is configured to determine that the one or more additional resource blocks are included in the resource allocation.

29. An apparatus for wireless communication, comprising:
means for identifying that a last resource block of a resource allocation for a physical downlink shared channel (PDSCH) is in a last allocable resource block group (RBG); and means for determining whether one or more additional resource blocks, subsequent to the last resource block, are included in the resource allocation for the PDSCH based at least in part on at least one of a reference signal type associated with the PDSCH, a quantity of the one or more additional resource blocks, or a downlink control information (DCI) format of the resource allocation, wherein, when the reference signal type associated with the PDSCH is a cell-specific reference signal (CRS) type, the wireless communication device is configured to determine that the one or more additional resource blocks are included in the resource allocation.

* * * * *